Oct. 10, 1961          A. P. LANG          3,003,609

ARMATURE DISK FOR CLUTCH BRAKE UNIT

Filed Sept. 10, 1959

INVENTOR.
A. P. LANG

BY Charles C. English

AGENT

United States Patent Office 3,003,609
Patented Oct. 10, 1961

3,003,609
ARMATURE DISK FOR CLUTCH BRAKE UNIT
Albert P. Lang, Philadelphia, Pa., assignor to Sperry Rand Corporation, New York, N.Y., a corporation of Delaware
Filed Sept. 10, 1959, Ser. No. 839,205
7 Claims. (Cl. 192—84)

The present invention relates to clutch/brake units of the type which are to be found frequently in small and intricate high speed mechanical devices. Such small and high speed mechanisms, for example, are often to be found associated with input-output equipment forming a portion of an overall data processing system. However, there are many other similar types of intricate high speed mechanisms to which the clutch/brake unit, as contemplated herein, will be applicable and these will suggest themselves to experts in the art.

The problem of maintenance in such mechanisms, as are herein contemplated, is often difficult and costly and is aggravated in many instances by the difficulty of access to those portions of the mechanism which require such maintenance. The present invention has been provided to reduce the amount of time and effort required to replace certain wearing portions of a clutch/brake mechanism. Through use of the invention it is no longer necessary to disassemble completely the entire clutch/brake unit in order to replace this particular wearing element.

Accordingly, it is an object of the invention to provide a new and improved clutch/brake unit for use in small and intricate high speed machinery.

It is a further object of the invention to provide a new and improved clutch/brake unit wherein the frictional facings, which are subject to greatest wear, may readily be removed and replaced without necessitating a disassembly of the entire unit.

In achieving the foregoing objectives a magnetic clutch/brake unit is contemplated wherein a magnetic armature disk is mounted upon a shaft rotatably journalled in a centrally located bearing contained in a magnetic unit. Interposed between the magnetic unit and the armature disk is a frictional facing ring of a composition material. The selective actuation of the magnetic unit causes mutual attraction between the armature disk and the magnetic unit and axial compliance of the latter is sufficient so that the facing ring constitutes a frictional coupling between the armature and the magnetic unit. With the armature locked to the magnetic unit the rotation of one will effect the rotation of the other; or in the case where braking is desired such locking will effectively couple the rotatable member to a stationary member such as the machine frame. In order that the facing ring, which is subject to wear, may readily be replaced without necessitating disassembly of the overall combination, the invention provides a new and improved armature disk in which a slot is milled radially in the circumference of the armature disk at a substantial angle to the axis of the aforesaid disk and to a depth sufficient to enable one side of the facing ring to be worked thereinto. It then becomes possible, by providing a slight separation between the armature disk and the magnetic unit, to work the facing ring over the armature disk without necessitating disassembly of the disk and the magnetic unit.

For a fuller understanding of the invention attention is now directed to the accompanying drawings in which.

Figure 1:
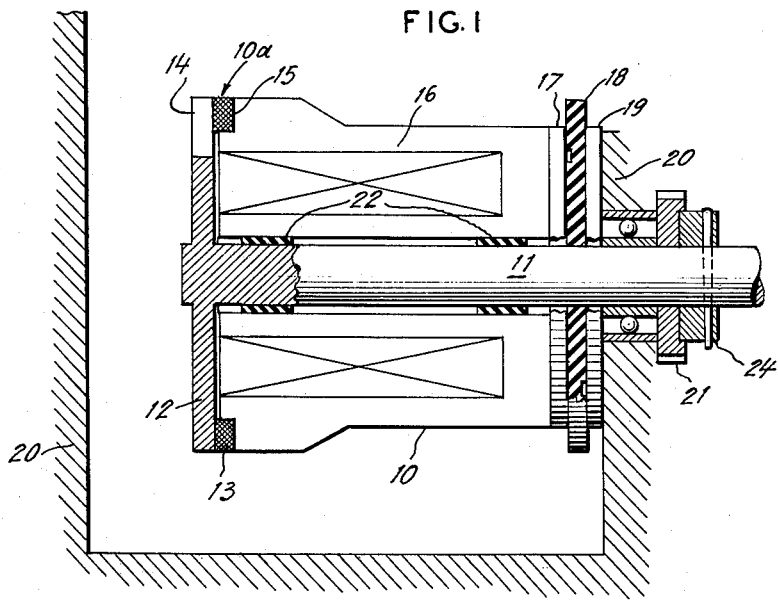
FIGURE 1 is a diagrammatic illustration of a cross-section of an assembled brake unit including magnetic unit, slotted armature disk and the friction facing.
Figure 2:
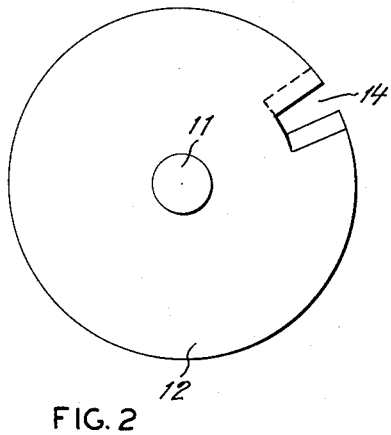
FIGURE 2 is an end view of the armature disk alone.
Figure 3:
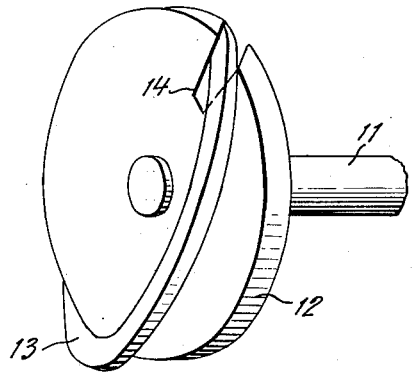
FIGURE 3 is a perspective view of the armature disk showing the manner in which the slot is placed and the manner in which the facing ring may be worked over the disk through use of the aforesaid slot.

In FIGURE 1 a cylindrical housing 10 made from a metal casting or the like is terminated at one end 10a to form a clutch or brake facing plate. As indicated, housing 10 may serve either as a clutch unit or as a brake unit depending upon whether the housing is driven from an external prime mover or is anchored to the frame work 20 of a machine. As shown herein, however, housing 10 serves as a brake unit for a rotatable shaft 11 which extends through a central bore formed in the housing. Surrounding the central bore and disposed within the housing 10 is a magnetic solenoid winding 16 which may be selectively energized through application of current from an external source. A pair of sleeve bearings 22 disposed within the central bore of housing 10 permit rotation of the shaft 11 relative to the housing 10. Rigidly attached to shaft 11 and rotatable therewith is armature disk 12. Disk 12 which is formed of a magnetic iron or the like is located on shaft 11 in juxtaposition with the end facing 10a of housing 10 whereby energization of the solenoid coil 16 mounted in the housing 10 will effect axial movement of the housing 10 towards the armature disk 12. Such movement of housing 10 is made possible through the use of a coupling member such as an Oldham coupling. This may comprise a member 17 fastened to the unit 10 and provided with fingers extending in an axial direction; a member 19 also provided with such fingers, and a slotted plate 18 is interposed between 17 and 19 so that the fingers may be received into the slots. If member 19 is fastened to the machine frame as at 20, then the mechanism serves as a brake. If member 19 should be attached to the output shaft of a prime mover, then the mechanism serves as a clutch. In either event the use of a coupling arrangement such as described, premits axial compliance of the unit 10 and moreover allows for misalignment of shafts. Interposed between the armature disk 12 and the end facing 10a of the housing 10 is a friction ring 13 which may be formed from a variety of materials, the choice of which is dependent upon the type of service for which the mechanism is intended. Included among these materials are resins such as polyfluorides (Teflon), nylon, or materials such as asbestos. Such ring serves as a clutch or brake facing whereby the selective movement of the housing 10 towards the armature disk 12 will effect a frictional coupling between the aforesaid armature and housing. The friction ring 13 is disposed in an annular rabbet 15 milled around the external end facing 10a of the housing 10.

As will be apparent to those skilled in the art, the friction ring 13 is an item in the assembly which is subject to considerable wear and, therefore, must be replaced from time to time. To facilitate such replacement, the armature 12 is constructed with a slot 14 milled in its circumference. Such a slot extends radially inward towards the shaft 11 along a plane inclined to the plane of the armature 12. The angle of the plane of the slot to the plane of the armature is not necessarily critical and in a typical instance may be, say, 45°. The slot 14 is made of sufficient width to accommodate the axial width of the friction ring 13 and is milled to a depth somewhat greater than the radial width of the friction ring 13 so that by first sliding the ring 13 partly over the armature 12 and into the slot 14, it is possible to then work the ring completely over the armature disk without essentially removing the armature disk from the proximity of the housing 10.

Mounted on shaft 11 on the side of the Oldham coupling remote from armature 12 is a gear 21 which may be retained in place by means of a taper pin 24. Such gear serves to connect shaft 11 with other portions of the machine in which the mechanism is to be used. By removing the taper pin it is possible to slide shaft 11 a short distance without actually disassembling the mechanism.

The manner in which the invention was meant to be employed is thought to be obvious from the foregoing description thereof. A typical application as shown in FIGURE 1 would find the mechanism surrounded by other mechanism and difficult of access. If, as shown, the amount of axial movement permitted shaft 11 is very limited by proximity of other elements or frame 20 (FIGURE 1), it is still possible by virtue of the invention to replace a worn facing ring without the necessity of substantial disassembly. When it is desired to replace a worn clutch or brake facing, it is simply necessary to effect a comparatively small axial shift of the unit 10 relative to armature disk 12 to an extent sufficient to enable the facing ring 13 to be worked into the slot 14. Such an axial shift could be brought about simply by removing the taper pin 24 retaining gear 21 on shaft 11. Once ring 13 has been placed in slot 14, it is easy to slip the worn ring over the entire armature disk so that it is no longer interposed between disk 12 and unit 10 whereupon it may then be removed by slipping over the disk. A new facing is then inserted by a reversal of the foregoing procedure and when in place the necessary running adjustments of the overall mechanism may readily be made. Gear 21 would once more be fastened in place by reinsertion of the taper pin.

It is clear that a new and useful improvement has been effected in clutch/brake units of the type described herein whereby it is no longer necessary to disassemble the entire unit in order to replace a clutch facing.

Various modifications of the invention may suggest themselves to those skilled in the art and it is, therefore, to be understood that the description herein is not meant to be limited to the precise embodiment shown but that the only limitations of the invention are such as are to be found in the appended claims.

I claim:

1. A combination of the class described comprising a housing element, a rotatable shaft journalled in said housing element, an armature disk having substantial axial thickness fixed to said shaft so as to be rotatable therewith, a friction ring supported in a circumferential end groove on said housing for providing a frictional coupling between said housing and said armature disk, and radially directed slot means cut entirely through the axial thickness and extending over a portion only of the periphery of said armature disk whereby said friction ring may be removed from said combination while the other elements of said combination remain assembled.

2. The combination of claim 1 wherein said housing element comprises a braking unit and includes electromagnetic coils.

3. The combination of claim 2 wherein said armature disk is formed from magnetic material and said housing element is axially movable relative to said armature disk, whereby actuation of said electromagnetic coils tends to move said housing element toward said armature disk.

4. In a clutch or brake unit, selectively actuable magnetic means, a rotatable magnetic armature means associated with said magnetic means, friction means interposed between said magnetic means and said armature means whereby said armature is selectively locked frictionally to said magnetic means, said armature means having the form of a circular disk with substantial axial thickness and a slot cut entirely through the axial thickness over a portion only of the periphery so that said friction means may be replaced while said magnetic means and said armature means remain assembled.

5. The clutch brake unit of claim 4 wherein said friction means comprises a ring of composition material having the same diameter as said armature means and said slot is cut radially into the circumferential rim of said armature means at an angle to the axis of said armature and to a depth sufficient to enable the shifting of said friction means thereover.

6. In a clutch or brake assembly the combination of, a cylindrical housing member having a central bore extending therethrough, said housing member including an annular groove formed in one end face thereof, a friction ring disposed within said annular groove, a rotatable shaft extending through said central bore, a magnetic armature disk having substantial axial thickness attached to said shaft in juxtaposition to said one end face, and a solenoid carried by said housing and operative upon energization thereof to effect relative axial movement of said armature and said housing to provide a frictional coupling therebetween, said armature disk including a radial slot cut through the thickness across the periphery thereof at an angle to the axis of said shaft to facilitate replacement of said friction ring.

7. A clutch or brake assembly comprising a cylindrical housing having a centrally located axial bore extending therethrough, selectively operable electromagnetic means retained in said housing around said bore, bearing means in said bore, a rotatable shaft extending through said bore supported by said bearing means, a portion of said shaft extending axially beyond one end of said housing and having a magnetic armature disk integral therewith, annular friction means mounted on the end of said housing adjacent said armature disk, said armature disk having a slot cut across its periphery radially directed toward its axis and at an angle to said axis whereby said annular friction means may be removed from the assembly over said armature disk without the necessity of removing said armature disk and shaft from the assembly.

References Cited in the file of this patent

UNITED STATES PATENTS 2,180,412     Hart _____ Nov. 21, 1939